United States Patent
Loewen et al.

(10) Patent No.: US 11,037,426 B2
(45) Date of Patent: Jun. 15, 2021

(54) SYSTEMS AND METHODS FOR COMBINED LIGHTING AND RADIATION DETECTION

(71) Applicant: GE-Hitachi Nuclear Energy Americas LLC, Wilmington, NC (US)

(72) Inventors: Eric P. Loewen, Wilmington, NC (US); Scott L. Pfeffer, Wilmington, NC (US); Maria E. Pfeffer, Wilmington, NC (US); Seth Ryan Paul Strege, Wilmington, NC (US)

(73) Assignee: GE-Hitachi Nuclear Energy Americas LLC, Wilmington, NC (US)

( * ) Notice: Subject to any disclaimer, the term of this patent is extended or adjusted under 35 U.S.C. 154(b) by 0 days.

(21) Appl. No.: 15/452,696

(22) Filed: Mar. 7, 2017

(65) Prior Publication Data

US 2018/0261068 A1    Sep. 13, 2018

(51) Int. Cl.
| | | |
|---|---|---|
| *G08B 21/12* | (2006.01) | |
| *G01T 7/00* | (2006.01) | |
| *H05B 47/18* | (2020.01) | |
| *H05B 47/19* | (2020.01) | |
| *H05B 47/175* | (2020.01) | |
| *H05B 47/185* | (2020.01) | |

(52) U.S. Cl.
CPC ............ *G08B 21/12* (2013.01); *G01T 7/00* (2013.01); *H05B 47/175* (2020.01); *H05B 47/18* (2020.01); *H05B 47/185* (2020.01); *H05B 47/19* (2020.01)

(58) Field of Classification Search
CPC ........ G08B 21/12; G01T 1/18; H05B 37/0227
USPC ...................................................... 340/600
See application file for complete search history.

(56) References Cited

U.S. PATENT DOCUMENTS

| | | |
|---|---|---|
| 3,082,392 A | 3/1963 | Mclean |
| 3,117,229 A | 1/1964 | Friedland |
| 3,312,823 A | 4/1967 | Bonner et al. |
| 3,670,719 A | 6/1972 | Kobayashi et al. |
| 4,429,299 A | 1/1984 | Kabat et al. |

(Continued)

OTHER PUBLICATIONS

GE Lighting, "Control Systems" accessed Mar. 8, 2017 (available at http://www.gelighting.com/LightingWeb/na/solutions/control-systems/index.jsp).

(Continued)

*Primary Examiner* — Hirdepal Singh
(74) *Attorney, Agent, or Firm* — Ryan Alley IP

(57) ABSTRACT

Devices work as both area lighting and ionizing radiation detectors. The lighting is adjustable in response to radiation detection, warning nearby users about radiation. Multiple devices can be plugged into electrical outlets throughout a plant or building to replace conventional lighting like lightbulbs or CFLs. Each device can transmit alerts to notify nearby users and transmit data to processors for aggregation and analysis. The data can be sent wirelessly, over fiber optic cable, as power line communications or otherwise. The data can be multiplexed along a single line. The devices may be in known locations or located based on an ID in the data. This data can be used to locate radiation sources and facilitate analysis and alerting at the location. Operators may respond to the radiation detection by issuing commands to the devices to change lighting output, adjust radiation detection parameters, and take corrective or ameliorative action in the facility.

20 Claims, 4 Drawing Sheets

(56) References Cited

U.S. PATENT DOCUMENTS

| | | | |
|---|---|---|---|
| 4,924,098 A * | 5/1990 | Wasserman | G01T 1/185 |
| | | | 250/374 |
| 5,637,964 A | 6/1997 | Hakkarainen et al. | |
| 5,770,996 A | 6/1998 | Severson et al. | |
| 6,144,292 A | 11/2000 | Brown | |
| 7,245,212 B2 | 7/2007 | Cope et al. | |
| 7,307,511 B2 | 12/2007 | Kline | |
| 7,701,330 B2 | 4/2010 | Iwamura | |
| 8,410,630 B2 | 4/2013 | Campbell | |
| 8,457,793 B2 | 6/2013 | Golding et al. | |
| 8,571,411 B2 * | 10/2013 | Pederson | H04B 10/1143 |
| | | | 398/115 |
| 8,750,394 B2 | 6/2014 | Molina et al. | |
| 9,049,756 B2 | 6/2015 | Klusmann et al. | |
| 2007/0188427 A1 * | 8/2007 | Lys | H05B 33/0815 |
| | | | 345/82 |
| 2009/0012745 A1 * | 1/2009 | Longman | G01T 7/00 |
| | | | 702/179 |
| 2012/0126988 A1 * | 5/2012 | Kaplan | G01T 1/17 |
| | | | 340/600 |
| 2012/0326046 A1 | 12/2012 | Aslam et al. | |
| 2013/0134886 A1 | 5/2013 | Golding et al. | |
| 2014/0049107 A1 | 2/2014 | Marx | |
| 2014/0247891 A1 | 9/2014 | Schwager et al. | |
| 2015/0008328 A1 * | 1/2015 | Takeuchi | H01J 47/08 |
| | | | 250/385.1 |
| 2016/0105750 A1 * | 4/2016 | Cagdaser | H04R 3/00 |
| | | | 381/174 |
| 2017/0184729 A1 * | 6/2017 | Stanton | G01T 1/20 |
| 2017/0238388 A1 * | 8/2017 | Ashoff | H05B 33/0854 |

OTHER PUBLICATIONS

GE LED Lamps & Modules, "LED Lams & Modules" accessed Mar. 8, 2017 (available at http://www.gelighting.com/LightingWeb/na/solutions/led-lamps-and-modules/index.jsp).

* cited by examiner

SYSTEMS AND METHODS FOR COMBINED LIGHTING AND RADIATION DETECTION

BACKGROUND

Large-scale lighting, such as illumination systems used in commercial and industrial settings typically rely on multiple lighting elements connected through one or more circuits to a power source, with some switching element to control one or more light status. As shown in FIG. 1, a lighting element 25, such as a high-intensity discharge fluorescent, LED, incandescents, etc., is conventionally mounted in a ballast 20 or other electrically integrated structure to allow replacement of light 25 and condition and direct power to the same. A power source 10, such as offsite power from an electrical grid, local power from a generator, or even a battery, provides electrical power to ballast 20 and light 25 through closed circuit 11. Power source 10 may include a switch or other conditioning element that modifies the power supplied to light 25 and thus allows illumination control. Of course, several lights 25 and/or ballasts 20 may be distributed throughout a lighted facility 1 on circuit 11.

In addition to electrical power, circuit 11 may be configured to carry control signals 12 to ballast 20 and/or light 25. Control signals 12 may be generated by power source 10 in connection with an operator or controlling processor, for example. Control signals 12 may be interpreted by circuitry in ballast 20 or in light 25 directly and may include commands such as light intensity, color, power down, etc. that cause lighting element 25 to produce different desired illumination. Control signals 12 may be used to set routines, illumination patterns, conserve energy, etc. by conditioning behavior or status of lighting element 25 on desired criteria. For example, known intelligent/customizable lighting systems are described in US Pat Pub 2013/0134886 published May 30, 2013 to Golding et al.; U.S. Pat. No. 8,457,793 issued Jun. 4, 2013 to Golding et al.; and US Pat Pub 2014/0049107 published Feb. 20, 2014 to Marx, the contents of which are incorporated herein by reference in their entireties.

If facility 1 is a nuclear power plant, typically several circuits 11 are installed throughout the plant in each space, such as a control room lighting circuit, turbine deck lighting circuit, auxiliary building room circuits, allowing illumination of individual spaces for workers to perform operations and remote monitoring. Some circuits 11, such as those in a control room or critical safety areas, may be installed with seismic controls and with emergency power access to ballast 20 or light 25 to preserve operations in transient scenarios. Circuits 11 may be separated or scattered among several different circuits in a single area to preserve lighting functionality in case any one circuit fails.

SUMMARY

Example embodiments include devices dual-purpose modules that both monitor alpha, gamma, and beta radiation as well as provide customizable and responsive levels of wide area or floor illumination in a single integrated device. Example devices may include a resistive mount or seat that can be seated into and removed from an electrical outlet just like a conventional lighting element such as a lightbulb or fluorescent tube, and a lighting element and radiation detector powered by the ballast. The lighting element could be an LED, neon, fluorescent, incandescent, or other large light that can illuminate an area, and the radiation detector could be a Geiger-Müller tube with digitizer, scintillation material with photovoltaic cell, semiconductor detector, etc., potentially paired with a computer processor or other output-shaping circuitry. The light and detector may share a circuit and be powered from the same outlet, with appropriate voltage stepping and current division to operate the two separately. The lighting element is adjustable in response to the detector detecting radiation, for example, by strobing, changing color, intensifying, etc., to make nearby radiation known to personnel. Further in response to detected radiation, example embodiment devices may transmit data of the same to a controller, operator, or other processor for analysis or remote alerting in example systems. The data can be sent as a power line communication from a ground of the power outlet to the processor or via other wired or wireless methods.

Example methods include installing combined radiation and lighting devices to provide light in areas of a building. Multiple such devices may be installed in existing power systems, such as in existing light plugs and outlets or in a new lighting circuit permanently installed for illumination. Radiation detected output and settings input can be multiplexed along a single channel to a controller. In this way, during operations of a nuclear plant or other facility, both radiation detection and responsive lighting control may be realized. In example methods, locations of the devices may be known or determined from received signals, such that location methods can be used to pinpoint exact locations of radiation sources. Analysis or responsive alerting may be undertaken in response to the determined locations, such as identifying a hazardous area or a probabilistic risk or failing safety feature, for example. The results of such analysis may be transmitted to operators or other safety personnel, potentially in a graphical manner, in example methods. Operators may respond to the radiation detection by issuing commands to the devices to change lighting output and/or adjust radiation detection parameters.

BRIEF DESCRIPTIONS OF THE DRAWINGS

Example embodiments will become more apparent by describing, in detail, the attached drawings, wherein like elements are represented by like reference numerals, which are given by way of illustration only and thus do not limit the example embodiments herein.

DETAILED DESCRIPTION

Figure 1:
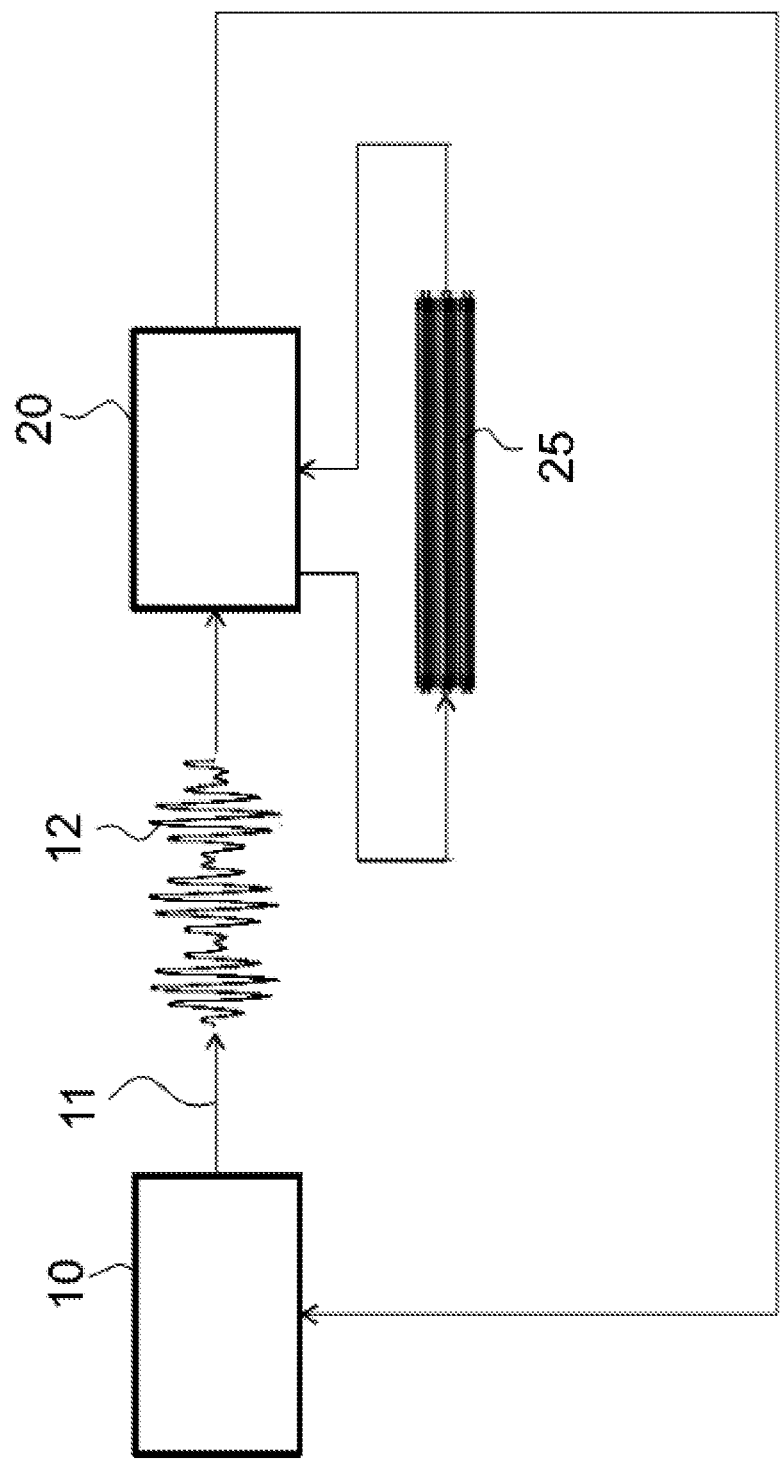
FIG. 1 is a schematic of a related art circuit for an illuminated facility.

Because this is a patent document, general broad rules of construction should be applied when reading it. Everything described and shown in this document is an example of subject matter falling within the scope of the claims, appended below. Any specific structural and functional details disclosed herein are merely for purposes of describing how to make and use examples. Several different embodiments and methods not specifically disclosed herein may fall within the claim scope; as such, the claims may be embodied in many alternate forms and should not be construed as limited to only examples set forth herein.

It will be understood that, although the terms first, second, etc. may be used herein to describe various elements, these elements should not be limited to any order by these terms. These terms are used only to distinguish one element from another; where there are "second" or higher ordinals, there merely must be that many number of elements, without necessarily any difference or other relationship. For example, a first element could be termed a second element, and, similarly, a second element could be termed a first element, without departing from the scope of example embodiments or methods. As used herein, the term "and/or" includes all combinations of one or more of the associated listed items. The use of "etc." is defined as "et cetera" and indicates the inclusion of all other elements belonging to the same group of the preceding items, in any "and/or" combination(s).

It will be understood that when an element is referred to as being "connected," "coupled," "mated," "attached," "fixed," etc. to another element, it can be directly connected to the other element, or intervening elements may be present. In contrast, when an element is referred to as being "directly connected," "directly coupled," etc. to another element, there are no intervening elements present. Other words used to describe the relationship between elements should be interpreted in a like fashion (e.g., "between" versus "directly between," "adjacent" versus "directly adjacent," etc.). Similarly, a term such as "communicatively connected" includes all variations of information exchange and routing between two electronic devices, including intermediary devices, networks, etc., connected wirelessly or not.

As used herein, the singular forms "a," "an," and "the" are intended to include both the singular and plural forms, unless the language explicitly indicates otherwise. It will be further understood that the terms "comprises," "comprising," "includes," and/or "including," when used herein, specify the presence of stated features, characteristics, steps, operations, elements, and/or components, but do not themselves preclude the presence or addition of one or more other features, characteristics, steps, operations, elements, components, and/or groups thereof.

The structures and operations discussed below may occur out of the order described and/or noted in the figures. For example, two operations and/or figures shown in succession may in fact be executed concurrently or may sometimes be executed in the reverse order, depending upon the functionality/acts involved. Similarly, individual operations within example methods described below may be executed repetitively, individually or sequentially, so as to provide looping or other series of operations aside from single operations described below. It should be presumed that any embodiment or method having features and functionality described below, in any workable combination, falls within the scope of example embodiments.

The Inventors have recognized that radiation monitoring is desirable in several different types of settings as both a warning of a transient or dangerous situation as well as a monitor for managing personnel radiation exposure and industrial/commercial operations. In, for example, nuclear reactor power plants, factories using radionuclides, medical radiation facilities, nuclear fuel processing plants, etc., it is often desired to have area radiation monitoring to detect dangerous or abnormal radiation levels throughout the facility. The inventors have recognized that such radiation monitoring conventionally requires a separate system that is dedicated to radiation monitoring. For example, in a commercial nuclear reactor facility, an area radiation monitoring system with several discrete radiation detectors is typically distributed throughout the plant. Each detector draws its own power from non-safety-related voltage sources and provides local warning to workers if impermissible radiation levels are detected. In such a system, each detector much be individually calibrated and networked with a main control room, which greatly increases burden and limits the number of detectors used in a plant. Example embodiments described below address these and other problems recognized by the Inventors with unique solutions enabled by example embodiments.

The present invention is combined radiation detectors and lights as well as systems and methods of using the same. In contrast to the present invention, the small number of example embodiments and example methods discussed below illustrate just a subset of the variety of different configurations that can be used as and/or in connection with the present invention.

Figure 2:
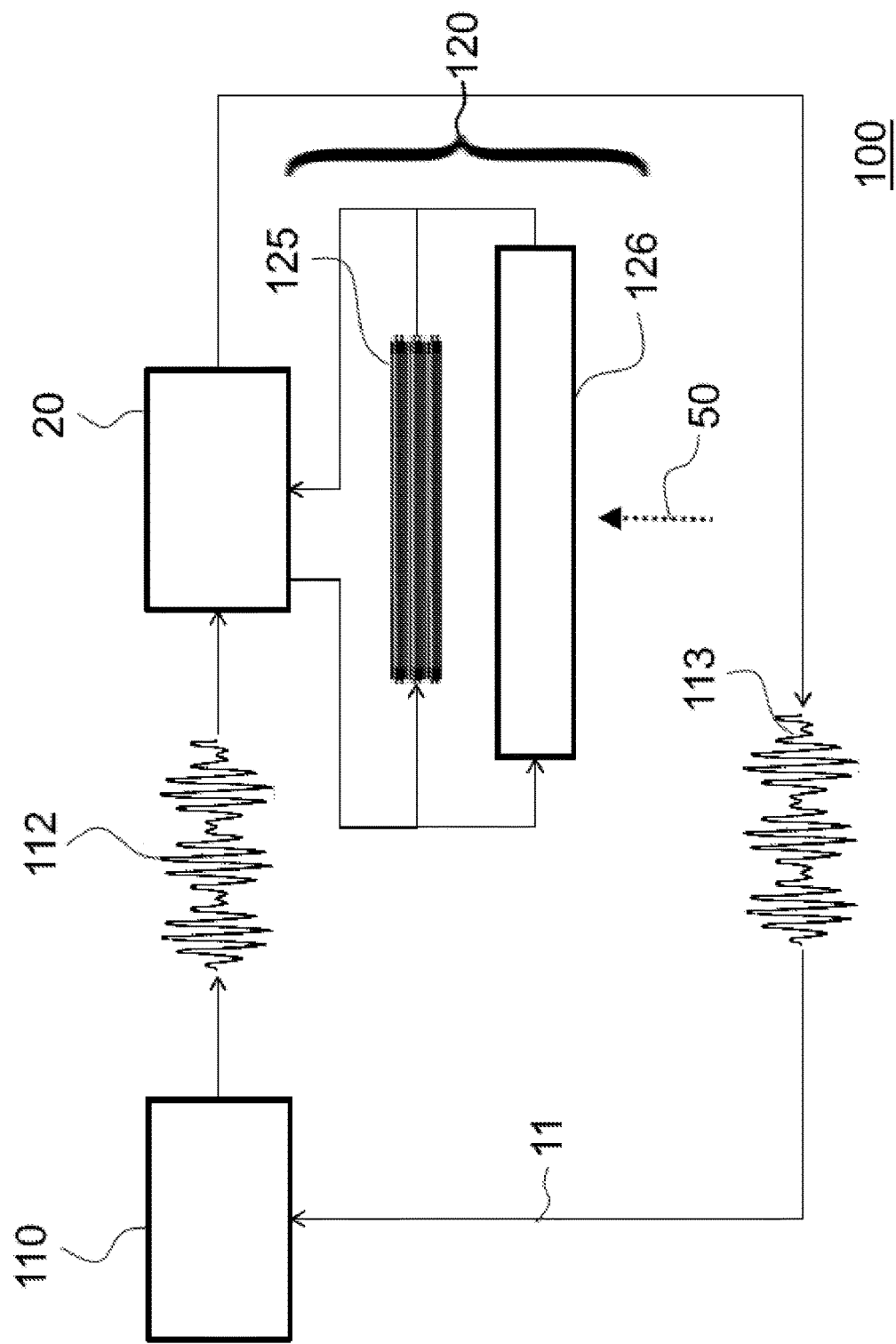
FIG. 2 is a schematic of an example embodiment system for lighting and radiation detection.

FIG. 2 is a schematic of an example embodiment combined lighting and radiation monitoring system 100 useable wherever lighting is installed. For example, example embodiment system 100 may be used with and/or a part of a nuclear facility lighting system, such as lighting in a nuclear plant, a fuel fabrication plant, a medical radioisotope administration area, etc. As seen in FIG. 2, example embodiment system 100 may be used on existing power lines forming circuit 11 in a facility, or on a new power system dedicated to powering example embodiment system 100.

Example embodiment combined lighting and radiation monitoring system 100 includes an example embodiment radiation-detecting lighting unit (R&L unit) 120 having a lighting element 125 and a radiation detector 126. Lighting element 125 may be similar to light 25 from FIG. 1, such as an LED, incandescent, fluorescent, etc. light that is generally useable to light a facility. Example embodiment R&L unit 120 including element 125 and radiation detector 126 may be modular and individually removeable/installable with ballast 20 or other plug or switch that is standardized or uniquely joined with R&L unit 120 on electrical circuit 11. For example, R&L unit 120 may be outwardly identical to an incandescent or LED bulb used in an office building having a standard plug-shaped ballast 20, or may match a high-intensity discharge fluorescent lighting fixture operating off a 4-wire grounded industrial outlet and having a matching plug on ballast 20. Example embodiment R&L unit 120 may, for example, otherwise be identical to the configuration and functionality of co-owned GE Lighting such as Stik™ and Biax™ and control systems including LightGrid™, LightSweep™, and/or Aware™ systems and controls, described by data sheets at www.gelighting.com/LightingWeb/na/solutions/control-systems/index.jsp and www.gelighting.com/LightingWeb/na/solutions/led-lamps-and-modules/index.jsp, incorporated herein by reference in their entireties, with the addition of the functionalities described herein. In the example of a nuclear power plant, example embodiment R&L unit 120 may be used as both standard office lights as well as plant lights distributed throughout a control room, reactor containment building, auxiliary building, office portion, etc.

Because example embodiment R&L unit 120 may be used wherever lighting is desired, often in combination with existing powered circuitry 11, radiation detection may be achieved in a granular and low-burden manner. That is, unlike related area radiation detection systems, example embodiments do not require dedicated systems to be individually installed in desired areas but are concomitantly installed wherever lighting is used. Further, by locally or remotely giving radiation detection information, personnel occupying or operating areas illuminated by example embodiments may be able to determine radiation hazards and non-standard operating conditions at precise levels using existing infrastructure.

Radiation detector 126 may be any type of detector that is capable of generating a signal from detected ionizing radiation. For example, radiation detector 126 may be a digital gamma radiation detector, a semiconductor detector, a gaseous ionization detector such as a Geiger-Müller tube, a scintillation counter, etc. Radiation detector 126 may include a receiver and signal generator configured to operate through ballast 20 on a same electrical circuit 11 as lighting element 125 with compatible electrical characteristics, such as 480/277 volt AC power systems or standard 120 volt AC power systems. For example, radiation detector may operate on a scale of milliamps, whereas lighting element 125 may operate on a scale of amps, and a receiver in radiation detector 126 may appropriately convert the electrical power to that useable for radiation detection by detector 126. Or, for example, radiation detector 126 could be powered in series with, or by a separate circuit from, lighting element 125. Radiation detector 126 may further be locally powered through a battery and/or independent power source from circuit 11.

Desired or relevant radiation types and levels, such as alpha, beta, and/or gamma radiation, may be detected using an appropriate detector 126. While a single detector 126 is shown in FIG. 2 in front of lighting element 125, it is understood that multiple detectors 126 may be used, potentially behind or around lighting element 125. For example, an alpha/beta radiation detector 126 could be used on a front or outward-most position of example embodiment R&L unit 120 while a gamma radiation detector 126 could separately be used behind or at a back of lighting element 125, to better discriminate between the types of radiation detected. Similarly, multiple, redundant radiation detectors 126 could be used for verification or backup.

As incident radiation 50 enters radiation detector 126, an information-bearing signal is generated based on the amount and/or type of radiation detected by detector 126. The signal may be digitized using an analogue-to-digital converter in any signal-generating circuitry receiving raw output from, for example, an ion chamber or scintillation field with photo-sensitive detector. With appropriate signal-shaping circuitry and/or digital conversion and analysis, radiation above a threshold level of ionizations/second or amount of energy received may generate a particular signal, which may increase in amplitude or other characteristics proportionally with more radiation detected. Desired hardware, such as an analog-to-digital converter or processor with appropriate configuration or software, may be integrated with radiation detector 126 or placed in another location such as ballast 20 or remotely, as along as access to output from radiation detector 126 is available. As such, virtually any type of signal bearing useful radiation detection information—radiation type, amount, energy, sequence, etc.—may be output by radiation detector 126 with an appropriate power receiver and data processing circuitry and/or software.

Figure 3:
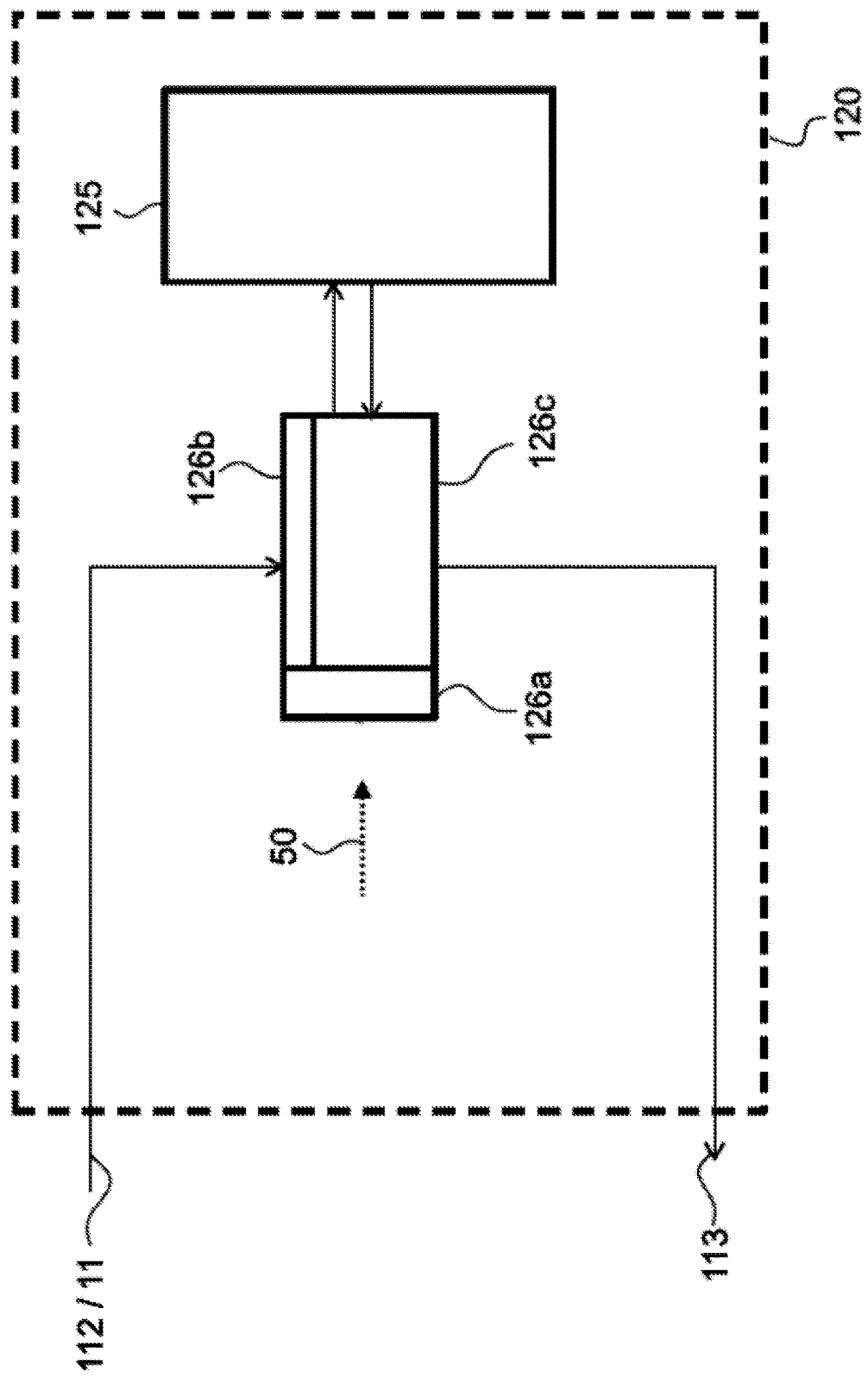
FIG. 3 is a schematic of an example embodiment lighting and radiation detection unit.

Radiation signals output by detector 126 are used locally and/or remotely transmitted in example embodiment system 100. In an example of local functionality, FIG. 3 illustrates a schematic of example embodiment R&L unit 120 that may use a dimmable, strobe-capable, or color-adjustable lighting element 125 in conjunction with an adapter/controller that changes lighting characteristics of element 125 in response to information received from radiation detector 126. For example, upon detection of radiation 50 exceeding a regulatory or desired limit based on a voltage output of an ionization chamber 126a powered by a receiver 126b, detector 126 may output an electrical signal from a processor or digitizer 126c that is above a threshold voltage. That higher voltage electrical signal may cause lighting element 125 to strobe, which is detectable even by color-blind or poorly-sighted personnel. Or, for example, upon detection of radiation 50 associated with a transient scenario—like detection of a particular-energy gamma ray associated with a specific radionuclide that can only leak from a primary coolant loop in a nuclear reactor—processor 126c may generate a characteristic signal that trips a sound alarm or generates an infrared warning signal that is picked up by personnel equipment near example embodiment R&L unit 120. Any local functionality, including visual or audio alarming or signaling, may be powered from a same ballast and/or separate power source from lighting element 125 and radiation detector 126.

In an example of remote functionality, example embodiment R&L unit 120 may deliver radiation detection data to remote systems or operators, such as control room personnel or offsite data analysis or monitoring systems. For example, as shown in FIG. 3, using the same circuit 11 on which power is delivered to and conditioned by receiver 126b, a communication 113 may be transmitted on the same circuitry 11 for detection by an operator or appropriate receiver communicatively connected to circuit 11. For example, communication 113 may be a power line communication superimposed on voltage on an electrified line or sent through a ground line. Any type of power line communication may be used, including those described in U.S. Pat. No. 6,144,292 issued Nov. 7, 2000 to Brown; U.S. Pat. No. 8,571,411 issued Oct. 29, 2013 to Pederson et al.; U.S. Pat. No. 7,245,212 issued Jul. 17, 2007 to Cope et al.; U.S. Pat. No. 8,410,630 issued Apr. 2, 2013 to Campbell; U.S. Pat. No. 4,429,299 issued Jan. 31, 2984 to Kabat et al.; and U.S. Pat. No. 7,701,330 issued Apr. 20, 2010 to Iwamura, all incorporated herein by reference in their entireties.

Or, for example, example embodiment R&L unit 120 may deliver radiation detection data in communication 113 through wireless communication over WiFi or infrared signals, or via a separate data line such as a fiber optic link to remote operators or monitoring systems. Data sent in communication 113 or otherwise transmitted back to an operator may reflect a characteristic of detected radiation, including type, energy level, timing, intensity, etc. Data sent in communication 113 may further include meta or system information data, including a location and ID of R&L unit 120, status of R&L unit 120 including detected malfunction or failure of illumination element 125, light status/color/intensity, diagnostic data, operational characteristics of radiation detector 126 such as preamplification level or bias voltage or any filter or signal generation threshold, and/or other operational data such as a request to dim or strobe attendant lighting element 125 by a controller 110 or operator who has authority to do so.

As seen in FIGS. 2 and 3, example embodiment R&L unit 120 may also receive and respond to command signals 112 issued by an operator or other command structure through cable, wireless, and/or power line communications. Command signals 112 may include lighting controls, such as color, intensity, schedule, strobe pattern, on/off, etc. of lighting element 125. Command signals 112 may further include instructions to radiation detector 126, such as alert thresholds, format of any communications 113, on/off, and/or change in operational characteristics such as revising any current or preamplification by receiver 126b or analog-todigital conversion or data processing by radiation detector processor 126c. In this way, command signals 112 may calibrate or adjust operation of radiation detector 126 on an individualized basis, resulting in desired radiation detection even in varied radiation environments.

As seen in FIG. 2, in example embodiment lighting and radiation monitoring system 100, controller 110 may receive communications 113, transmit control signals 112, and or provide power over circuit 11 to/from example embodiment R&L unit 120. For example, controller 110 may include a wireless receiver, power source/transformer, power line communication extractor, computer processor, etc. properly formatted to generate these features of example system 100. In this way, example embodiments are useable with existing lighting outlets and wiring simply by installing example embodiment R&L units 120 and optionally a controller 110 in communicative connection with the same.

Figure 4:
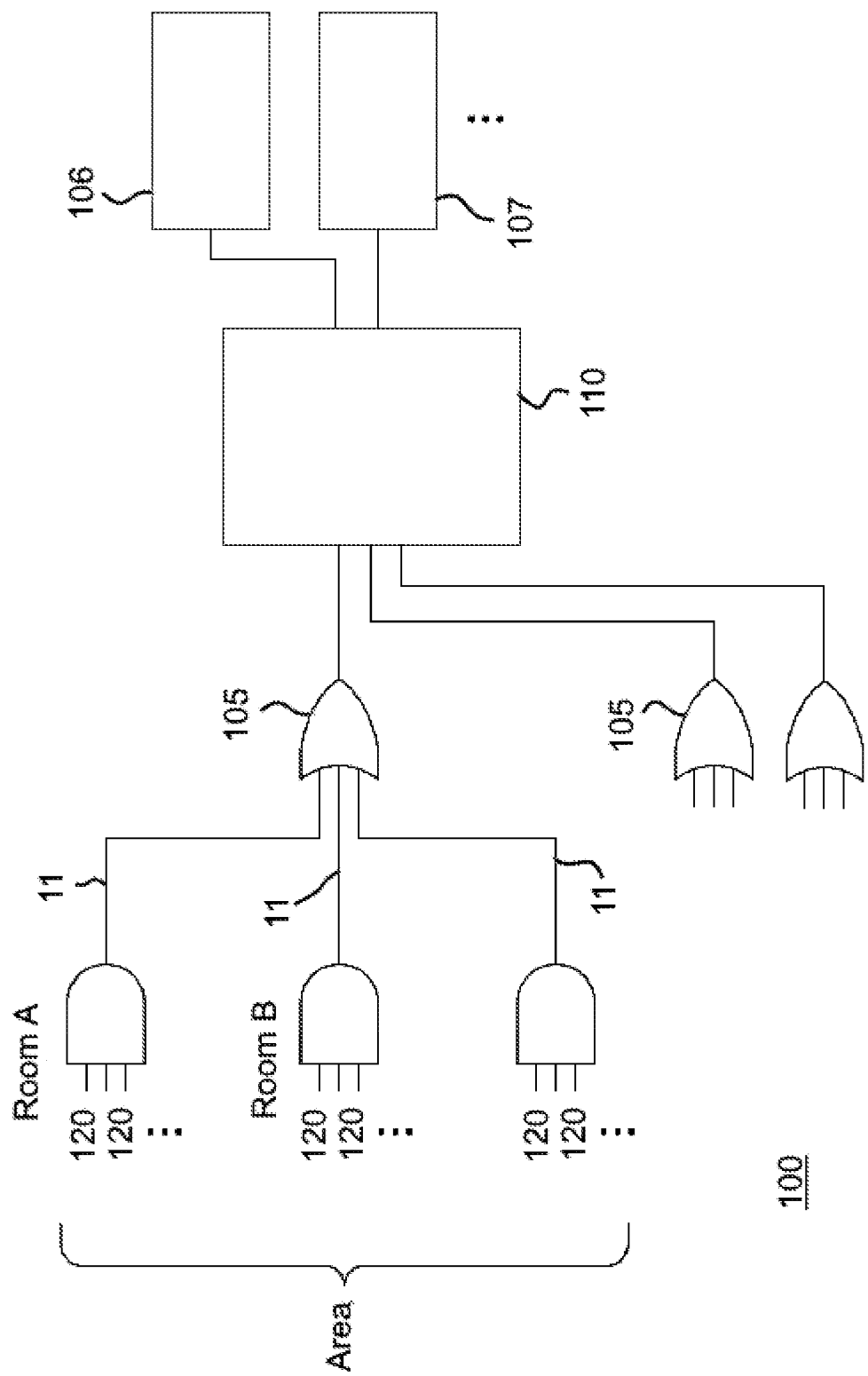
FIG. 4 is a schematic of an example embodiment system using multiple lighting and radiation detection units.

Controller 110 may interface with multiple example embodiment R&L units 120, potentially all on a single circuit 11 or on multiple circuits 11. As such, controller 110 is configured to discriminate between incoming communications 113 based on source and issue commands 112 in an individualized fashion. FIG. 4 is a schematic of example embodiment system 100 including multiple example embodiment units 120 multiplexed or otherwise combined on a shared circuit 11 through power line communications. For example, several light outlets with example R&L units 120 in a first Room A and a second Room B may be combined at a multiplexor 105 for a whole Area. In this way multiple communications 113 and/or command signals 112 may be transmitted between a single controller 110 and multiple example embodiment R&L units 120, potentially using existing electrical networks for lighting.

As shown in FIG. 4, because lighting outlets and example units may be placed in numerous, known locations throughout a room or area, controller 110 can gather fine levels of radiation data from existing light patterns and/or light wiring/communications. For example, by having an identity or location for each example embodiment R&L unit 120 in a Room A, controller 110 can associate radiation data from multiple example embodiment R&L units 120 with a likely radiation source, such as through triangulation of detector data. Controller 110 may further associate radiation data from known locations with equipment or situations at that location, creating likely failure or transient condition warnings. For example, by demuxing communications 113 (FIG. 2) from each example R&L unit 120 in Room A containing a feed water pump, controller 110 may identify radiation levels as higher from lighting units around the pump, potentially even pinpointing a radiation type associated with reactor coolant on the pump's breakdown orifice based on data from several R&L units 120 staggered around the pump, as lighting typically is. Controller 110 may thus determine that a pump is likely leaking or failed, based on the detected radiation location and type. In this way, controller 110 may create a heat map or location table reflecting radiation conditions across facility locations, allowing operators to better understand condition of radiation-handling parts, plan personnel operations or repairs based on those conditions, and/or enable avoidance or escape from transient conditions with minimal radiation exposure.

Similarly, as shown in FIG. 4, controller 110 may issue control signals 112 (FIG. 2) to individual example embodiment R&L units 120 based on detected room or area characteristics or operator commands. For example, controller 110 may detect from several example R&L units 120 in a particular Room A a higher level of background gamma radiation and instruct only and each example lighting and radiation detection unit 120 in Room A to use a higher threshold or lower voltage bias to eliminate signaling or alerting based on the higher background. Controller 110 may dispatch such instructions via control signals 112 (FIG. 2) through multiplexer 105 with IDs for example embodiment R&L units 120 to be adjusted, ensuring only desired R&L units 120 are modified. Controller 110 may also set an internal higher threshold for data and radiation signals received from example embodiment R&L units 120 in Room A to filter out background radiation. Or, for example, controller 110 may, after receiving a nonstandard radiation level from a single example R&L unit 120 in Room B, selectively instruct only all other example embodiment R&L units 120 in Room B to begin strobing or otherwise alerting personnel to the radiation level to encourage personnel to leave the Room B entirely.

Controller 110 may further provide granular and/or analyzed radiation data to plant operators through a controller readout 106 and to alarm systems 107. For example, controller readout 106 may be a screen or illuminated plant schematic in a control room on which controller 110 can highlight or overlay abnormal radiation detection locations based on data reported from one or more example embodiment R&L units 120. Controller readout 106 may further present a list of facility components or areas of interest associated with abnormal or dangerous radiation levels and potentially a likely failure/scenario associated with the same, such as "likely leakage on low pressure turbine" or the like based on analyzed radiation readouts from several lights in the area.

Because there are typically many lighting outlets and units in any given space, controller 110 and readout 106 may have large amounts of raw and analyzed data available for operator consumption due to the number of R&L units 120 and amount of different data produced by each. Controller 110 and readout 106 may prioritize critical alerts for operators, such as nuclear plant control room operators, to avoid distraction or interference in transient management when radiation levels may be higher. For example, controller 110 may prioritize radiation information, alerts, or alarms given on readout 106 or to alarm system 107 based on violations of NRC regulations in 10 C.F.R. Parts 20, 50, 52, 73, and 100; the criticality or safety-related functionality of a linked or associated system having off-normal radiation levels detected; the impact of a linked or associated system having off-normal radiation levels to a plant's probabilistic risk assessment or technical specifications; the likelihood that detected radiation will be released to the environment; and/or the likelihood that detected radiation will significantly impact personnel health and safety.

Controller readout 106 may be interactive, allowing operators to input commands or queries, such as finding a highest radiation level among several R&L units 120 in a particular room, changing an alarm threshold or light element response (e.g., different strobe pattern or different color change). Controller readout 106 may further permit operators to see lower-level data from individual R&L units 120 to determine if any unit is malfunctioning or understand the status of any R&L unit 120, such as illumination color, level, strobing, other alarming, on/off status, power consumption, radiation alarm thresholds, detector type, radiation detection history, etc.

Alarm system 107 may be existing or new alarms and automated systems, such as automatic trip systems or area notification sirens for a nuclear plant. Alarm system 107 may trigger appropriate action based on measured radiation or analysis output by controller 110. For example, upon detection of radiation above a critical level associated with a severe accident, alarm system 107 may trigger plant-wide alarms and trip the nuclear reactor. Or, for example, alarm system 107 may be an existing security system that notifies authorities or operators to investigate an area showing abnormal radiation levels as indicated by controller 110.

Because example embodiment R&L units 120 may use existing lighting position throughout a facility, radiation detection can be simultaneously achieved with lighting goals. With the addition of a receiver or controller to decode or pick up data generated by example embodiment units in an example system using several units, much radiation data can be gathered remotely for central analysis and correlation with system operations. Example embodiment R&L units 120 may be installed in electrical outlets at any time during plant operations, during an outage, or during fabrication prior to plant startup. Similarly, a controller 110 may be installed on an existing circuit or new communications network at any time, such that example embodiments, methods, and operation of the same will not interfere with other activities at a relevant facility.

Some example embodiments being described here, it is understood that one or more examples and components thereof may be used in combination and/or in duplication to provide radiation detection and responsive lighting. It will further be appreciated by one skilled in the art that example embodiments may be varied through routine experimentation and without further inventive activity. For example, although some examples are discussed in the context of industrial or commercial facilities, it is understood that example embodiment units are useable in residential or other facilities having lighting. Variations are not to be regarded as departure from the spirit and scope of the exemplary embodiments, and all such modifications as would be obvious to one skilled in the art are intended to be included within the scope of the following claims.

What is claimed is:

1. A combined lighting and radiation detection unit comprising:
    a ballast configured to removably join to and draw power from an electrical outlet;
    a light secured with and configured to draw power from the ballast;
    an ionizing radiation detector secured with and configured to draw power from the ballast; and
    a controller configured to change output of the light from a constant visible light to a light visibly varying in time in response to ionizing radiation detected by the ionizing radiation detector exceeding a threshold of a regulatory or safe ionizing radiation level, wherein the ionizing radiation detector includes an alpha/beta radiation detector on an outward-most side of the unit and a gamma radiation detector behind the light.

2. The unit of claim 1, wherein the light, the ballast, and the detector are integrated into a single, modular lighting element, and wherein the lighting element is one of an LED bulb, a fluorescent bulb, and an incandescent bulb.

3. The unit of claim 1, wherein the ionizing radiation detector is a Geiger-Müller tube having a different operating current/voltage than the light, and wherein the light and the ionizing radiation detector are electrically connected in parallel to the ballast.

4. The unit of claim 3, wherein the ionizing radiation detector includes a receiver configured to step voltage and current to the operating current/voltage and a processor configured to transmit a digital signal indicating ionizing radiation detected by the radiation detector.

5. The unit of claim 1, further comprising:
    a sound alarm, wherein the controller is configured to change light output of the light to a strobe and output an audible alarm sound from the alarm in response to ionizing radiation detected by the ionizing radiation detector exceeding the threshold.

6. The unit of claim 1, wherein the light is an LED, wherein the controller, the light, the ballast, and the radiation detector are all an integrated part of an LED bulb, and wherein the changed light output is a strobing output.

7. The unit of claim 1, wherein the ionizing radiation detector is configured to output results of radiation detection through the ballast into the outlet.

8. The unit of claim 7, wherein the ionizing radiation detector further includes a processor configured to output the results as digital signals on a power line communication through the ballast into the outlet, and wherein the results as digital signals include information of a type and an amount of radiation detected by the ionizing radiation detector.

9. The unit of claim 8, wherein the ballast is configured to electrically connect to a ground line of the outlet so that the digital signals are output on the ground line.

10. A system of combined illumination and radiation detection, the system comprising:
    a lighting circuit permanently installed in a facility, wherein the circuit has a plurality of electrical outlets;
    a plurality of combined lighting and radiation detection units each plugged into one of the plurality of outlets, wherein each of the units includes,
        a ballast configured to removably join to and draw power from the outlet,
        a light secured with and configured to draw power from the ballast, and
        an ionizing radiation detector secured with and configured to draw power from the ballast; and
    a controller configured to change output of the light from a constant visible light to a light visibly varying in time in response to ionizing radiation detected by the ionizing radiation detector exceeding a threshold of a regulatory or safe ionizing radiation level, wherein the ionizing radiation detector includes an alpha/beta radiation detector on an outward-most side of the unit and a gamma radiation detector behind the light.

11. The system of claim 10, wherein each of the plurality of units are plugged into a ground line of the one of the plurality of outlets, and wherein the plurality of units are configured to output radiation detection information over the ground line.

12. The system of claim 11, wherein the controller is connected to the ground line and configured to extract the radiation detection information from the ground line.

13. The system of claim 12, wherein the controller is further configured to determine a location of a radiation source based on the radiation detection information from the plurality of units.

14. The system of claim 13, wherein the controller is further configured to output the locations of radiation sources on a display for human operators.

15. The system of claim 14, wherein the facility is a nuclear power plant, and wherein the display is in a control room of the plant for plant operators.

16. The system of claim 12, further comprising:
    a multiplexer on the lighting circuit configured to combine output from all of the units onto a single line, wherein the controller is further configured to issue individual commands to each of the plurality of units from the single line through the multiplexer.

17. The system of claim 10, wherein the controller is communicatively connected to all of the plurality of units and configured to receive all ionizing radiation detection information from the ionizing radiation detectors.

18. A method of combined illumination and radiation detection, the method comprising:
joining a plurality of combined lighting and radiation detection units each into one of a plurality of electrical outlets, wherein each of the units includes,
a ballast configured to removably join to and draw power from the outlet,
a light secured with and configured to draw power from the ballast, and
an ionizing radiation detector secured with and configured to draw power from the ballast; and
changing output of the light in one of the units from a constant visible light to a light visibly varying in time in response to ionizing radiation detected by the ionizing radiation detector in the one of the units exceeding a threshold of a regulatory or safe ionizing radiation level, wherein the ionizing radiation detector includes an alpha/beta radiation detector on an outward-most side of the unit and a gamma radiation detector behind the light.

19. The method of claim 18, further comprising:
transmitting a power line communication from the one of the units through a lighting circuit permanently installed in a facility, wherein the circuit includes the plurality of electrical outlets, and wherein the power line communication is a digital signal including information of a type and an amount of radiation detected by the ionizing radiation detector.

20. A combined lighting and radiation detection unit comprising:
a screw connector configured to removably join to and draw power from a standard 120-volt screw-in light outlet;
a light secured with and configured to draw power from the connector;
an ionizing radiation detector secured with and configured to draw power from the connector; and
a controller configured to change output of the light from a constant visible light to a light visibly varying in time in response to ionizing radiation detected by the ionizing radiation detector exceeding a threshold of a regulatory or safe ionizing radiation level, wherein the ionizing radiation detector includes at least one of an alpha/beta radiation detector and a gamma radiation detector.

* * * * *